United States Patent [19]

Yamahara et al.

[11] 3,925,436

[45] Dec. 9, 1975

[54] PROCESS FOR PRODUCTION OF AROMATIC ISOCYANATES

[75] Inventors: Takeshi Yamahara, Itami; Masahiro Usui, Takatsuki, both of Japan

[73] Assignee: Sumitomo Chemical Company, Limited, Japan

[22] Filed: Mar. 22, 1974

[21] Appl. No.: 453,956

[30] Foreign Application Priority Data
Mar. 23, 1973  Japan.............................. 48-33910

[52] U.S. Cl..... 260/453 PC; 252/429 A; 252/429 C
[51] Int. Cl.². ......................................... C07C 118/06
[58] Field of Search ............................. 260/453 PC

[56] References Cited
UNITED STATES PATENTS

| | | | |
|---|---|---|---|
| 3,576,835 | 4/1971 | Madison et al. | 260/453 |
| 3,728,370 | 4/1973 | Ottmann et al. | 260/453 |
| 3,781,321 | 12/1973 | Hurley, Jr. et al. | 260/453 |

*Primary Examiner*—Lewis Gotts
*Assistant Examiner*—Dolph H. Torrence
*Attorney, Agent, or Firm*—Stewart and Kolasch, Ltd.

[57] ABSTRACT

A process for production of aromatic isocyanates by the reaction of an aromatic nitro compound with carbon monoxide at an elevated temperature under an elevated pressure in the presence of a catalyst, which is characterized in that the catalyst is a product obtained by contacting a halogen-containing platinum group metal compound with a high molecular weight compound having a nitrogen-containing heteroaromatic ring in the molecule and is advantageous in that the objective aromatic isocyanates can be produced in excellent yields and the catalyst can be readily separated and used repeatedly.

11 Claims, No Drawings

PROCESS FOR PRODUCTION OF AROMATIC ISOCYANATES

The present invention relates to a process for preparing aromatic isocyanates directly from aromatic nitro compounds and carbon monoxide.

For preparation of aromatic isocyanates from aromatic nitro compounds and carbon monoxide in the presence of an appropriate catalyst, there have been known a variety of processes. For example, in Belgian Patent No. 651,876, there is proposed a process where a platinum group metal is used as the catalyst. Further, in Japanese Patent Nos. 29976/1970, 34572/1970, 35774/1970, 35887/1970 and 39808/1970, there are disclosed processes in which a composition comprising a chloride of palladium or rhodium and a second component is used as the catalyst. However, these processes are not satisfactory for the industrial purpose, because the objective compound can not be obtained in a short time with a good yield. Besides, it is unclear whether the recovery and reuse of the catalyst are possible in those processes.

As the result of the study on the preparation of aromatic isocyanates from aromatic nitro compounds and carbon monoxide, it has now been found that the use of a product obtained by contacting a halogen-containing platinum group metal compound with a high molecular weight compound having a nitrogen-containing heteroaromatic ring in the molecule as the catalyst can afford aromatic isocyanates in a high yield. It has been also found that the catalyst once used can be readily separated from the reaction mixture and reused repeatedly. The present invention is based on these findings.

According to the present invention, there is provided a process for preparing aromatic isocyanates by the reaction of an aromatic nitro compound with carbon monoxide at a high temperature under an elevated pressure in the presence of a catalyst, which is obtained by contacting a halogen-containing platinum group metal compound with a high molecular weight compound having a nitrogen-containing heteroaromatic ring in the molecule, as a catalyst.

The halogen-containing platinum group metal compound to be used in the invention may be a halogen-containing compound of a platinum group metal such as palladium, rhodium, iridium, ruthenium, platinum or osmium. Specific examples are halides, i.e. fluorides, chlorides, bromides and iodides, carbonyl halides (e.g. palladium chlorocarbonyl, rhodium chlorocarbonyl, iridium chlorocarbonyl and ruthenium iodocarbonyl), complexes (e.g. palladium chloride-pyridine complex $(Pd(C_5H_5N)_2Cl_2)$, palladium chloride-isoquinoline complex $(Pd(C_9H_7N)_2Cl_2)$, rhodium chloride-pyridine complex $(Rh(C_5H_5N)_3Cl_3)$, palladium chloride-benzonitrile complex $(Pd(C_6H_5CN)_2Cl_2)$, palladium chloridetriphenylphosphine complex $(Pd[P(C_6H_5)_3]_2Cl_2)$, palladium chloride-picoline complex $(Pd(C_6H_7N)_2Cl_2)$, palladium chloride-orthophenanthroline complex $(Pd(C_{12}H_8N_2)_2Cl_2)$ and complex salts (e.g. palladium chloride sodium salt $(Na_2PdCl_4)$, palladium chloride ammonium salt $((NH_4)_2PdCl_4)$, palladium chloride potassium salt $(K_2PdCl_4)$), etc.

The high molecular weight compound having a nitrogen-containing heteroaromatic ring may be any high molecular weight compound having a nitrogen-containing heteroaromatic ring in the main or side chain of the molecule. The nitrogen-containing heteroaromatic ring means a 5- or 6-membered heteroaromatic ring containing a nitrogen atom. One of the typical examples of such ring is a pyridine ring.

The said high molecular weight compound is usually prepared by polymerization of monomers having a nitrogen-containing heteroaromatic ring.

Examples of the monomers having a nitrogen-containing heteroaromatic ring are 2-vinylpyridine, 3-vinylpyridine, 4-vinylpyridine, 2-methyl-5-vinylpyridine, 2-vinylquinoline, 4-vinylpyrimidine, vinylpyrazine, etc. These monomers may be polymerized without using any other monomer(s). Preferably, however, they are polymerized together with other polymerizable vinyl monomers and, especially, cross-linking agents. As the vinyl monomers, there may be employed styrene, vinyltoluene, butadiene, acrylonitrile, etc. Examples of the cross-linking agents are divinylbenzene, divinyl phthalate, ethylene glycol diacrylates, etc. There is no limitation on the proportion of the monomer(s) having a nitrogen-containing heteroaromatic ring, the vinyl monomer(s) and the cross-linking agent(s). It is, however, preferred that the amounts of the monomer(s) having a nitrogen-containing heteroaromatic ring and of the cross-linking agent(s) are respectively 5 to 50 % by weight and 1 to 20 % by weight based on the total amount of the said three components.

Said high molecular weight compound may also be prepared by chemical addition of a compound having a nitrogen-containing heteroaromatic ring to a suitable high molecular weight compound or by chemical treatment of a suitable nitrogen-containing high molecular weight compound so as to form a heteroaromatic ring in the molecule.

The high molecular weight compound having a nitrogen-containing heteroaromatic ring of the invention is desired to be insoluble in the reaction medium under the reaction conditions and also to be stable to heat, i.e. not to be decomposed or softened by heat. These requirements can be satisfied by appropriately selecting the structure of the main chain, the molecular weight and the degree of bridging of the high molecular weight compound. The high molecular weight compound may be used in an optional form such as powders or pellets.

The catalyst of the invention is characteristic in containing the said high molecular weight compound as its constituent. By the presence of such compound, tha catalyst can be used for a long time or repeatedly without lowering of the catalytic activity, and the catalyst can be readily separated from the reaction mixture.

Usually, the catalyst can be obtained by contacting the high molecular weight compound with a solution of the platinum group metal compound. The contact conditions are not limitative, and the contact is usually carried out at room temperature under atmospheric pressure for 0.5 to 30 hours. As for the proportion of the two compounds, the high molecular weight compound is preferably used in such an amount that the equivalent number of the nitrogen-containing heteroaromatic ring unit is 0.1 to 100 to 1 mol of the halogen-containing platinum group metal compound.

The amount of the catalyst used in the invention is desired to be $10^{-4}$ to 0.5 g.atom, preferably $10^{-2}$ to 0.2 g.atom, as the platinum group metal to 1 mol of the starting organic nitro compound.

Since the catalyst of the invention is insoluble in the reaction medium, it may be employed in a fixed bed process or a fluidized bed process.

In addition to the catalyst, the reaction system of the invention may contain as a reaction promoter any oxide of vanadium, molybdenum, tungsten, niobium, chromium, tantalum or the like (e.g. chromic oxide ($Cr_2O_3$), chromium dioxide ($CrO_2$), chromous oxide (CrO), molybdenum sesquioxide ($Mo_2O_3$), molybdenum dioxide ($MoO_2$), molybdenum trioxide ($MoO_3$), niobium monoxide (NbO), niobium dioxide ($NbO_2$), niobium pentoxide ($Nb_2O_5$), tantalum dioxide ($Ta_2O_2$), tantalum tetroxide ($Ta_2O_4$), tantalum pentoxide ($Ta_2O_5$), tungsten oxide ($WO_3$), vanadium dioxide ($V_2O_2$), vanadium trioxide ($V_2O_3$), vanadium tetroxide ($V_2O_4$), vanadium pentoxide ($V_2O_5$)).

The progress of the reaction of the invention can be also promoted by the addition of water to the reaction system. The amount of water may be usually from 0.1 to 20 mol % with respect to the starting nitro compound. The addition of water may be carried out by adding the same as such or in a mixture with the starting compound or the solvent to the reaction system.

The aromatic nitro compound as the starting material of the invention is an aromatic compound having at least one nitro group on the aromatic ring which may bear any other additional substituent. Examples of such compound are nitrobenzene, m-dinitrobenzene, o-nitrotoluene, P-nitrotoluene, 2,4-dinitrotoluene, 2,6-dinitrotoluene, 2,4-dinitro-m-xylene, 4,6-dinitro-m-xylene, p,p'-dinitrodiphenylmethane, 2,4-dinitroanisole, 2,6-dinitroanisole, etc.

The process of the present invention may be performed without using any solvent, but an appropriate organic solvent may be employed when desired. Examples of the solvent include aromatic, aliphatic and alicyclic hydrocarbons such as benzene, toluene, xylene, diphenyl ether, n-heptane and cyclohexane and halogenated hydrocarbons such as chlorobenzene, dichlorobenzene and monochlorodiphenyl ether.

The reaction is usually effected at a temperature of 100° to 250°C, preferably of 150° to 220°C. The partial pressure of carbon monoxide may be from 10 to 1500 atm., preferably from 100 to 1000 atm. The reaction time may vary depending upon the kind and the amount of the starting compound and the catalyst, the temperature, the pressure and so on. Normally, a reaction time of from 30 minutes to 10 hours is sufficient.

Aromatic isocyanates obtained by the present invention are used extensively in the preparation of polyurethane foams, coating compositions and fibers, and also as the reaction intermediates in the preparation of insecticides, pesticides and the like.

Practical and presently preferred embodiments of the present invention are illustratively shown in the following Examples wherein parts are by weight.

EXAMPLE A

A mixture of styrene (32 parts), 4-vinylpyridine (8 parts) and divinylbenzene (3.2 parts) and benzoyl peroxide (0.4 part) are added to water (160 parts) containing a dispersion stabilizer (a 5 % aqueous solution of polyvinyl alcohol-carboxymethyl cellulose) (1.6 parts) to make a dispersion, which is subjected to polymerization at 90°C for 3 hours with stirring under a nitrogen stream. The product is washed with water, acetone and hot chloroform in order to eliminate unreacted monomers and dried at 110°C for 5 hours. The thus obtained insoluble copolymer (3 g) is added to a solution of palladium chloride-pyridine complex ($Pd(C_5H_5N)_2Cl_2$) (1 g) in chloroform (100 ml), and the mixture is stirred at room temperature for 10 hours and then filtered. The collected material is washed well with chloroform and dried at 100°C for 3 hours to give an insoluble high molecular weight catalyst (hereinafter referred to as "SVP-Pd-2"). The content of palladium in the catalyst is 7.3 %.

EXAMPLE B

To a solution of palladium chloride-isoquinoline complex ($Pd(C_9H_7N)_2Cl_2$) (1.3 g) in chloroform (100 ml), the insoluble copolymer obtained in Example A (3 g) is added, and the mixture is stirred at room temperature for 10 hours. The mixture is filtered, and the collected precipitate is washed well with chloroform and dried at 100°C for 3 hours to give an insoluble high molecular weight catalyst (hereinafter referred to as "SVP-Pd-3") containing 6.9 % of palladium.

EXAMPLE C

A mixture of styrene (40 parts), 4-vinylpyridine (4 parts) and divinylbenzene (3.2 parts) and benzoyl peroxide (0.4 part) are added to water (160 parts) containing a dispersion stabilizer (a 5% aqueous solution of polyvinyl alcohol-carboxymethyl cellulose) (1.6 parts) to make a dispersion, which is subjected to polymerization at 90°C for 3 hours with stirring under a nitrogen stream. The product is washed with water, acetone and hot chloroform in order to eliminate unreacted monomers and dried at 110°C for 5 hours. The thus obtained insoluble copolymer (3 g) is added to a solution of palladium chloride-pyridine complex ($Pd(C_5H_5N)_2Cl_2$) (1 g) in chloroform (100 ml), and the mixture is stirred at room temperature for 10 hours and then filtered. The collected material is washed well with chloroform and dried at 100°C for 3 hours to give an insoluble high molecular weight catalyst (hereinafter referred to as "SVP-Pd-1"). The content of palladium in the obtained catalyst is 3.3 %.

EXAMPLE 1

In a 50 ml volume autoclave, there are charged 2,4-dinitrotoluene (2.5 g), SVP-Pd-2 (0.8 g) and benzene (8 g), and the contents are heated with stirring at 190°C for 3 hours under a carbon monoxide atmosphere (maximum pressure, 206 kg/cm$^2$). After the autoclave is cooled, the analysis of the reaction product is effected. The conversion of the starting 2,4-dinitrotoluene and the yield of toluene-2,4-diisocyanate are 27.4 % and 0.7 %, respectively. The yield of all of the produced isocyanates including 4-isocyanato-2-nitrotoluene and 2-isocyanato-4-nitrotoluene (hereinafter referred to as "total yield of isocyanates") is 24.6 %.

EXAMPLE 2

The reaction mixture obtained in Example 1 is filtered, and the collected precipitate is washed with benzene and dried at 100°C for 3 hours. Using the thus obtained precipitate as the catalyst, the same reaction as in Example 1 is effected. The analysis of the reaction product gives the following results: conversion of the starting 2,4-dinitrotoluene-diisocyanate, 32.4 %; yield of toluene-2,4-isocyanate, 1.9 %; total yield of isocyanates, 30.6 %.

The above procedure comprising the filtration of the reaction mixture, washing and drying of the collected precipitate and the use of the precipitate in the subsequent reaction as the catalyst is repeated an additional 7 times. After the completion of the eighth reaction, the analysis of the reaction product is carried out whereby the following results are obtained: conversion of the starting 2,4-dinitrotoluene, 30.7 %; yield of toluene-2,4-diisocyanate, 2.5 %; total yield of isocyanates, 26.2 %.

EXAMPLE 3

In a 50 ml volume autoclave, there are charged 2,4-dinitrotoluene (2.5 g), SVP-Pd-3 (0.82 g) and benzene (8 g), and the contents are heated with stirring at 190°C for 3 hours under a carbon monoxide atmosphere (maximum pressure, 210 kg/cm$^2$). After the autoclave is cooled, the reaction product is recovered. The analysis of the reaction product gives the following results: conversion of the starting 2,4-dinitrotoluene, 19.3 %; yield of toluene-2,4-diisocyanate, 0.2 %; total yield of isocyanates, 14.1 %.

EXAMPLE 4

In a 50 ml volume autoclave, there are charged 2,4-dinitrotoluene (2.5 g), SVP-Pd-2 (0.8 g), benzene (8 g) and molybdenum trioxide (0.077 g), and the contents are heated with stirring at 190°C for 3 hours under a carbon monoxide atmosphere (maximum pressure, 212 kg/cm$^2$). After the autoclave is cooled, the reaction product is recovered. The analysis of the reaction product gives the following results: conversion of the starting 2,4-dinitrotoluene, 40.3 %; yield of toluene-2,4-diisocyanate, 2.0 %; total yield of isocyanates, 32.5 %.

EXAMPLE 5

In a 50 ml volume autoclave, there are charged 2,4-dinitrotoluene (2.5 g), SVP-Pd-2 (0.8 g), molybdenum trioxide (0.077 g), water (9.6 × 10$^{-3}$ g) and benzene (8 g), and the contents are heated with stirring at 190°C for 3 hours under a carbon monoxide atmosphere (maximum pressure, 207 kg/cm$^2$). After the autoclave is cooled, the reaction product is recovered. The analysis of the reaction product gives the following results: conversion of the starting 2,4-dinitrotoluene, 43.2 %; yield of toluene-2,4-diisocyanate, 3.8 %; total yield of isocyanates, 34.7 %.

EXAMPLE 6

In a 50 ml volume autoclave, there are charged 2,4-dinitrotoluene (2.5 g), SVP-Pd-1 (1.7 g) and benzene (8 g), and the contents are heated with stirring at 190°C for 3 hours under a carbon monoxide atmosphere (maximum pressure, 209 kg/cm$^2$). After the autoclave is cooled, the reaction product is recovered. The analysis of the reaction product gives the following results: conversion of the starting 2,4-dinitrotoluene, 40.5 %; yield of toluene-2,4-diisocyanate, 4.2 %; total yield of isocyanates, 36.1 %.

EXAMPLE 7

In a 50 ml volume autoclave, there are charged 2,4-dinitrotoluene (2.5 g), SVP-Pd-1 (1.7 g), water (9.6 × 10$^{-3}$ g) and benzene (8 g), and the contents are heated with stirring at 190°C for 3 hours under a carbon monoxide atmosphere (maximum pressure, 207 kg/cm$^2$). After the autoclave is cooled, the reaction product is recovered. The analysis of the reaction product gives the following results: conversion of the starting 2,4-dinitrotoluene, 51.8 %; yield of toluene-2,4-diisocyanate, 5.2 %; total yield of isocyanates, 38.6 %.

EXAMPLE 8

In a 50 ml volume autoclave, there are charged 2,4-dinitrotoluene (2.5 g), SVP-Pd-1 (1.7 g), molybdenum trioxide (0.077 g), water (9.6 × 10$^{-3}$ g) and benzene (8 g), and the contents are heated with stirring at 190°C for 3 hours under a carbon monoxide atmosphere (maximum pressure, 210 kg/cm$^2$). After the autoclave is cooled, the reaction product is recovered. The analysis of the reaction product gives the following results: conversion of the starting 2,4-dinitrotoluene, 66.5 %; yield of toluene-2,4-diisocyanate, 9.2 %; total yield of isocyanates, 58.5 %.

What is claimed is:

1. A process for producing aromatic isocyanates which comprises reacting an aromatic nitro compound with carbon monoxide in the presence of a catalyst at an elevated temperature under an elevated pressure, the said catalyst being a product obtained by contacting a halogen-containing platinum group metal compound selected from the group consisting of the halides, carbonyl halides, complexes and complex salts of palladium, rhodium, iridium, ruthenium, platinum and osmium with a copolymer of styrene, vinylpyridine and divinylbenzene.

2. The process according to claim 1, wherein the amounts of vinylpyridine and of divinylbenzene are respectively about 5 to 50 % by weight and about 1 to 20 % by weight on the basis of the combined amount of the three monomers.

3. The process according to claim 1, wherein said copolymer is used in an amount such that the molar number of the vinylpyridine ring unit is 0.1 to 100 per 1 mol of the halogen-containing platinum group metal compound.

4. The process according to claim 1, wherein the amount of the catalyst is 10$^{-4}$ to 0.5 g.atom as the platinum group metal to 1 mol of the starting organic nitro compound.

5. The process according to claim 1, wherein the reaction is effected in the presence of a reaction promoter selected from the group consisting of the oxides of vanadium, molybdenum, tungsten, niobium, chromium and tantalum.

6. The process according to claim 1, wherein the reaction is effected in the presence of water.

7. The process according to claim 6, wherein the amount of the water is from 0.1 to 20 mol % with respect to the starting nitro compound.

8. The process according to claim 1, wherein the reaction is performed in an inert solvent.

9. The process according to claim 1, wherein the reaction is effected at a temperature of 100° to 250°C.

10. The process according to claim 1, wherein the reaction is effected under a partial pressure of 10 to 1500 atm. of carbon monoxide.

11. The process according to claim 1, wherein said halogen-containing platinum group metal compound is selected from the group consisting of the halides of palladium, rhodium, iridium, ruthenium, platinum or osmium, palladium chlorocarbonyl, rhodium chlorocarbonyl, iridium chlorocarbonyl, ruthenium iodocarbonyl, palladium chloride-pyridine complex, palladium chloride-isoquinoline complex, rhodium chloride-pyridine complex, palladium chloridebenzonitrile complex, palladium chloride-triphenylphosphine complex, palladium chloride-picoline complex, palladium chloride-orthophenanthroline complex, palladium chloride sodium salt, palladium chloride ammonium salt and palladium chloride potassium salt.

* * * * *